United States Patent [19]
Arnold et al.

[11] Patent Number: 5,406,158
[45] Date of Patent: Apr. 11, 1995

[54] MINIATURE SYNCHRONOUS MOTOR

[75] Inventors: David G. Arnold, Deerfield; John P. Duve, Brookfield; Jerome C. Klopp, Arlington Heights; Allan E. Visin, Crystal Lake, all of Ill.

[73] Assignee: Eaton Corporation, Cleveland, Ohio

[21] Appl. No.: 96,792

[22] Filed: Jul. 23, 1993

[51] Int. Cl.⁶ .......................................... H02K 21/00
[52] U.S. Cl. ........................... 310/692; 310/40 MM; 310/112; 310/156; 310/194; 310/208
[58] Field of Search ............. 310/40 MM, 49 R, 162, 310/194, 71, 41, 163, 156, 112, 164, 254, 179, 208, 214

[56] References Cited

U.S. PATENT DOCUMENTS

| | | | |
|---|---|---|---|
| 3,253,169 | 5/1966 | Haydon | 310/156 |
| 3,403,273 | 9/1968 | Higuchi | 310/162 |
| 3,551,711 | 12/1970 | Davis | 310/43 |
| 3,746,900 | 7/1973 | Morley | 310/41 |
| 3,790,834 | 2/1974 | Tanaka | 310/162 |
| 4,296,341 | 10/1981 | Güttinger | 310/41 |
| 4,529,903 | 7/1985 | Takahashi | 310/156 |
| 4,893,038 | 1/1989 | Miyzawa | 310/41 |
| 4,924,125 | 5/1990 | Clark | 310/67 R |
| 5,187,400 | 2/1993 | Kurata | 310/49 R |
| 5,298,820 | 3/1994 | Lee | 310/40 MM |

Primary Examiner—R. Skudy
Attorney, Agent, or Firm—Roger A. Johnston

[57] ABSTRACT

A bobbin or spool is molded of thermoplastic with one end flange of substantially greater diameter with a plurality of arcuately spaced voids through the flange. A coil is wound on the bobbin and a first ferromagnetic cup with integrally formed spaced finger-like plural pole segments in a circumferential array is axially received over the smaller spool flange and coil with the pole segments extending through the voids in the larger spool flange. A second ferromagnetic stator cup with finger-like spaced plural pole segments in a circumferential array is nested against the larger spool flange with the pole segments interdigitated with the pole segments on the first cup. A third stator member interconnects the first and second stator cups through the spool; and, a permanent magnet rotor is journalled on the third pole segment within the stator pole segments. The larger spool flange has electrical connectors received in slots and attached to the ends of the coil.

8 Claims, 3 Drawing Sheets

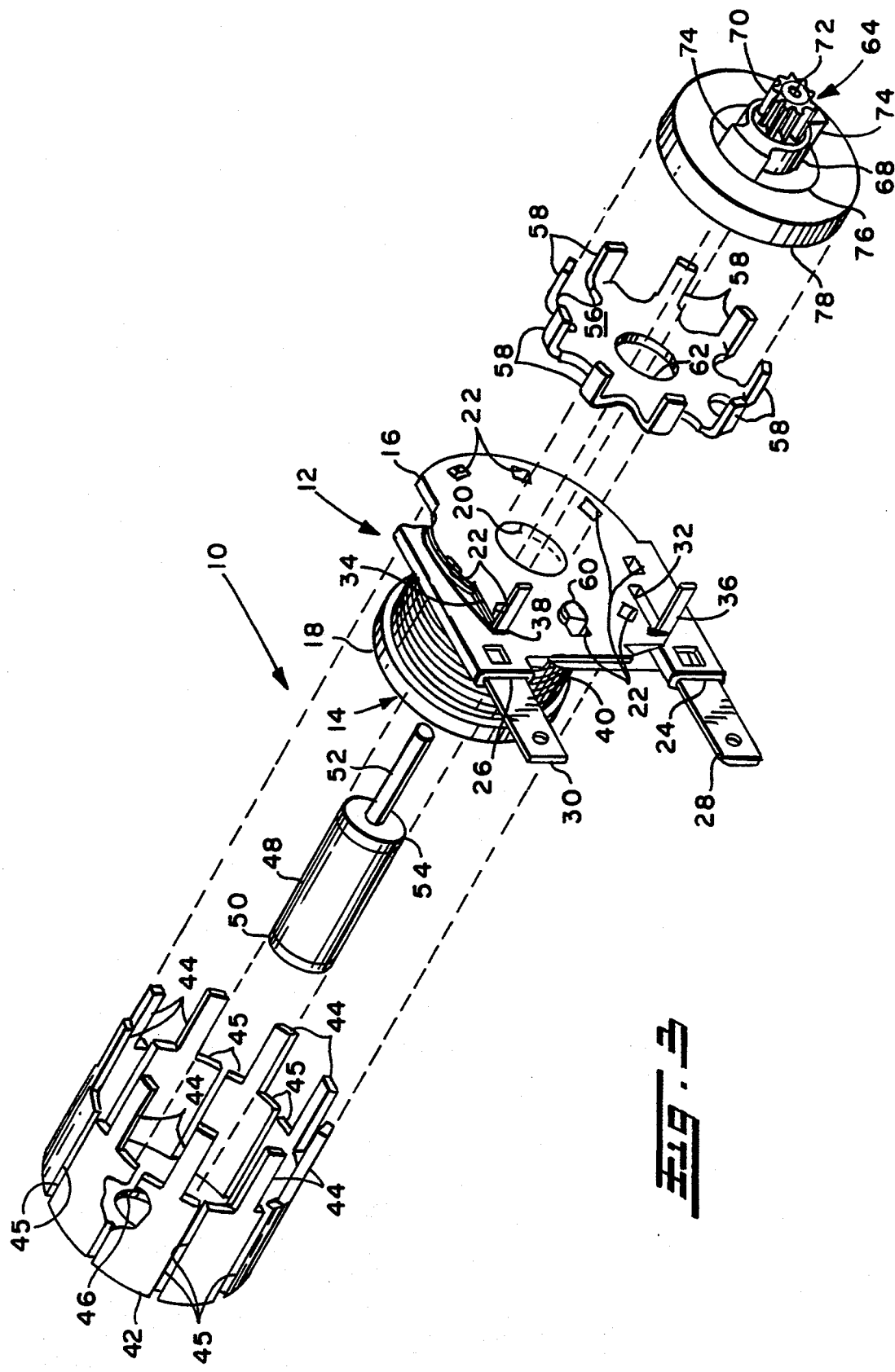

MINIATURE SYNCHRONOUS MOTOR

BACKGROUND OF THE INVENTION

The present invention relates to miniature or subfractional horsepower permanent magnet synchronous motors of the type typically employed for operating timing mechanisms and time-based electromechanical programmers. The invention relates particularly to such motors employed for operating the advance mechanisms and programmers utilized in household appliances such as washing machines, clothes driers, and dishwashers.

Such motors are also particularly suitable for powering small cooling fans employed for cooling electronic circuitry and equipment where compactness is required in order to locate the fan directly adjacent the particular electronic components such as those mounted on a circuit board. Other applications for such motors include aspirators associated with temperature sensing in a flow of air and liquid pumps, particularly for highly competitive mass production applications such as in automotive sensors and controls.

Heretofore, miniature synchronous motors have employed a coil wound around a bobbin which is assembled with a rotor and encased in a shell or housing which forms a part of the magnetic flux loop about the coil, and which may also contain the speed-reducing gear train for power coupling the motor to the mechanism to be driven. The known techniques for mounting the motor coil in the ferromagnetic stator pieces or housing have resulted in relatively expensive assembly operations and complex procedures for attaching the coil leads to connector terminals provided on the stator or housing. Therefore, it has long been desired to provide an improved design for a miniature synchronous timing motor having a minimum volume, and which results in reduced manufacturing costs, yet is simple and reliable.

SUMMARY OF THE INVENTION

The motor of the present invention has a coil bobbin or spool with an enlarged end flange extending radially outwardly a substantially greater distance than the opposite end flange with a pair of connector terminals received in slots provided in the enlarged flange. A coil of magnet wire is wound around the spool with the ends of the coiled conductor attached to bent-up tabs on the connector terminals by winding the ends therearound. The ferromagnetic stator means defines a flux loop about the coil and comprises a first stator member having a generally cup-shaped configuration with a plurality of axially-extending finger-like pole segments disposed in circumferentially spaced arrangement. The stator cup is received over the smaller end flange of the spool and the coil, with the finger-like pole segments passing through a plurality of arcuately spaced voids in the larger spool flange and axially therebeyond. A second stator member also has a generally cupped configuration with a plurality of finger-like pole segments extending axially therefrom in circumferentially spaced arrangement. The second stator member is nested against the end of the larger spool flange with its pole segments disposed in interdigitated arrangement with the pole segments of the first stator member. A third stator segment comprises an elongated member received through the center of the coil spool and interconnecting the first and second cup-shaped stator members to complete the flux loop about the coil. A pin or axle extends axially from the third stator segment; and the rotor hub having a permanent magnet ring thereon is mounted for rotation on the axle and disposed within the circumferentially spaced stator pole segments.

The unique design and assembly of the motor of the present invention combines the stator flux loop defining members with a cover or housing for the motor coil, which is assembled onto and supported by an integrally formed flange on the coil bobbin or spool, which construction eliminates the need for separate housing parts. The permanent magnet rotor hub is mounted for rotation directly on the central stator pole segment member, which minimizes tolerance accumulation between the stator members which would affect the free rotation of the rotor. The motor of the present invention thus provides an easy-to-assemble configuration which produces a miniature synchronous permanent magnet motor with minimum volume which may be fabricated utilizing automatic machinery for winding the stator coil on the bobbin, and provides for simplified terminal connection to the coil ends as a subassembly and provides a minimum number of parts assembled to the coil subassembly to yield a completed motor.

BRIEF DESCRIPTION OF THE DRAWINGS

FIG. 3 is an axonometric exploded view of the motor of FIG. 1;

DETAILED DESCRIPTION

Figure 2:
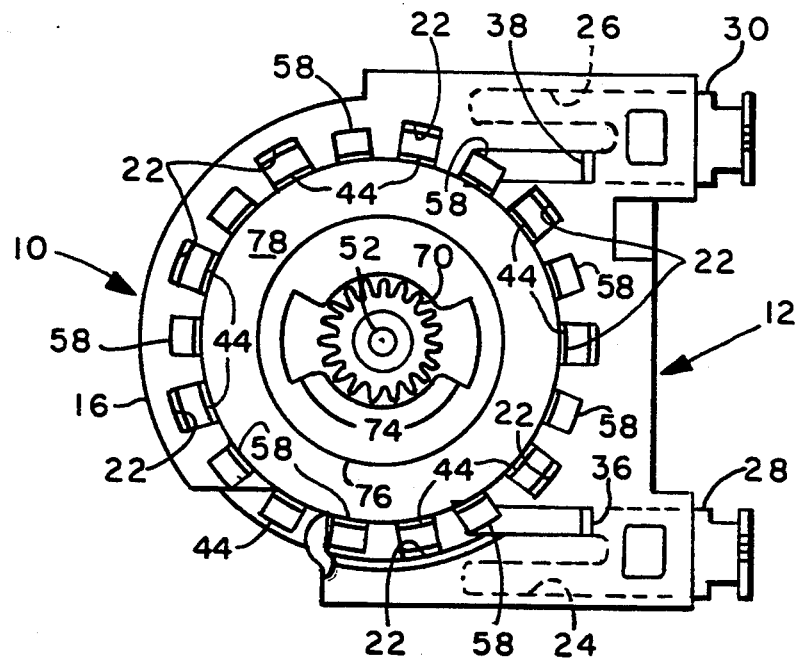
FIG. 2 is a top or plan view of the motor of FIG. 1.

Referring to FIGS. 1 through 6, the motor assembly indicated generally at 10 includes a coil subassembly indicated generally at 12 which includes a bobbin or spool indicated generally at 14, which has a radially-extending flange at each end thereof, with one end flange 16 extending radially outwardly a substantially greater amount than the flange 18 at the opposite end of the spool. The spool 14 has a central bore 20 formed therethrough for providing a ferromagnetic path for completing a flux loop about the coil, as will be hereinafter described. The larger spool flange 16 has provided therethrough a plurality of voids or apertures 22 which are disposed in arcuately or circumferentially spaced arrangement about the flange adjacent the periphery thereof in a generally circular pattern, with the radially inner surface of each of the apertures disposed at a distance greater than the outer diameter of the smaller flange 18.

Figure 1:
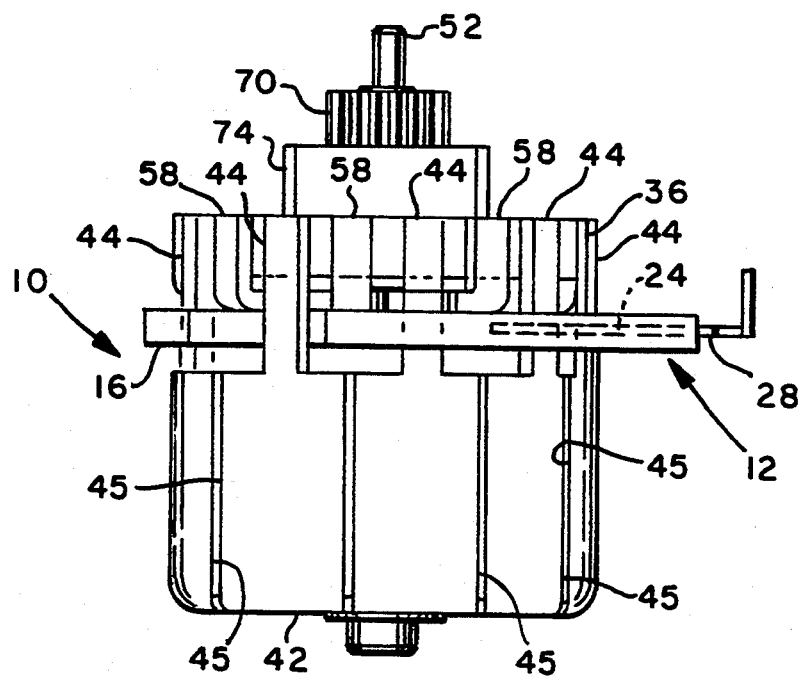
FIG. 1 is a side elevation view of the completed motor assembly embodying the present invention.

The larger spool flange 16 has a pair of spaced parallel recesses or slots 24,26 formed therein, each of which has a flat-blade type connector terminal received therein and denoted respectively by reference numerals 28,30 in FIGS. 1-3. Each of the slots 24,26 communicates with an opening respectively denoted by reference numerals 32,34 formed in the axial end face of the spool flange; and, each of the terminals 28,30 has a tab portion thereof denoted respectively by reference numerals 36,38 bent axially outwardly therefrom through one of the openings 32,34, respectively.

A coil of electrical conductor 40, preferably magnet wire, is wound over the spool or bobbin 14, and the ends of the coiled conductor are attached, respectively, one to each of the tabs 36,38 by any suitable manner as, for example, wrapping, or soldering.

In the presently preferred practice, the spool 14 with its integrally formed end flanges 16, 18 is formed of injection molded thermoplastic material such as a polyamide material which may, if desired, be filled a fractional percentage thereof by volume with fine glass particles. However, it will be understood that other materials may be employed such as, for example, calcium carbonate or talc. Also, thermosetting plastics may be employed, if desired, for the bobbin.

The coil subassembly 12 has received thereabout a stator means which provides a magnetic flux loop around the coil, and which includes a first stator member 42 or cage formed of material having a relatively high magnetic permeability which has a generally cup-shaped configuration with a plurality of finger-like pole segments indicated by reference numeral 44 which extend in an axial direction, and which are disposed in generally circumferentially or arcuately space arrangement. The outer diameter of the cup-shaped stator 42 and pole segments 44 are sized and configured so that upon axial assembly of the cup over the end of the flange 18 of bobbin 14, each of the pole segments 44 is aligned with and passes through one of the apertures 22 formed in the opposite flange 16 of the spool. The pole segments 44 on stator cup 42 extend axially beyond the end face of the spool flange 16 as is shown in FIG. 1. A cup-shaped stator member 42 has a central aperture 46 formed in the closed end thereof as shown in FIG. 3. In the presently preferred practice, the first stator member 42 is formed from sheet stock.

Figure 4:
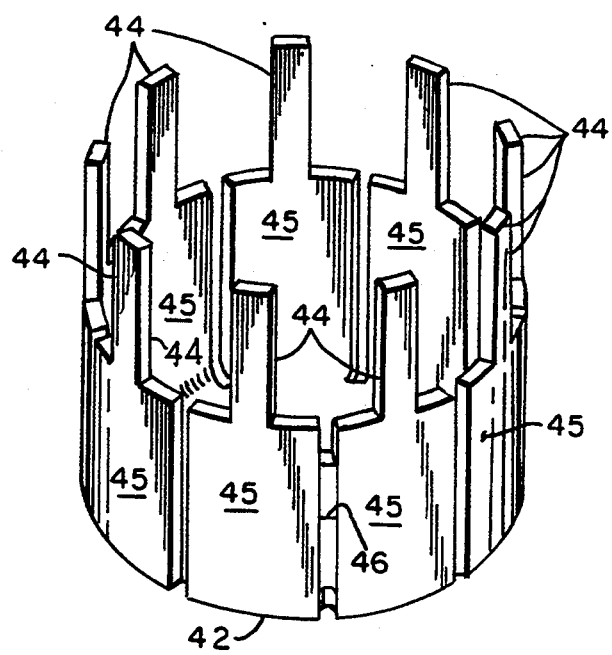
FIG. 4 is an isometric view of the stator cup member which covers the coil.

In the presently preferred practice, the stator member 42 is formed by stamping a somewhat spider-shaped blank from sheet stock, the plural arms of which have a wide base portion 45 and a reduced width pole segment portion 44 formed on the ends thereof. The base portions 45 are folded to extend in a direction perpendicular to the blank and in generally parallel arrangement in a cylindrical array as shown in FIGS. 3 and 4. It will be understood, however, that the stator member 42 with poles 44 may be fabricated by other techniques such as, for example, by sintering from powdered metal, metal injection molding, or by machining.

Figure 5:
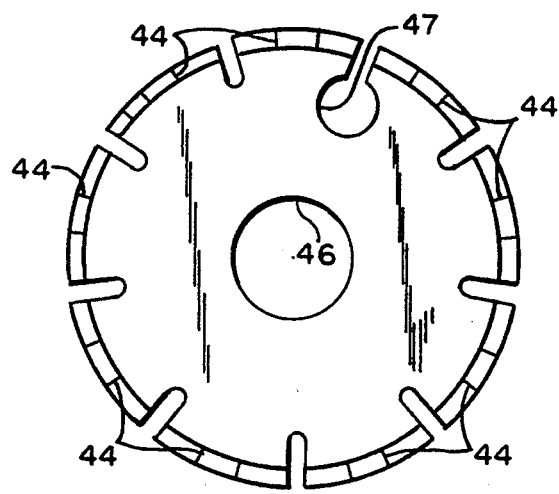
FIG. 5 is a top or plan view of the member of FIG. 4.
Figure 6:
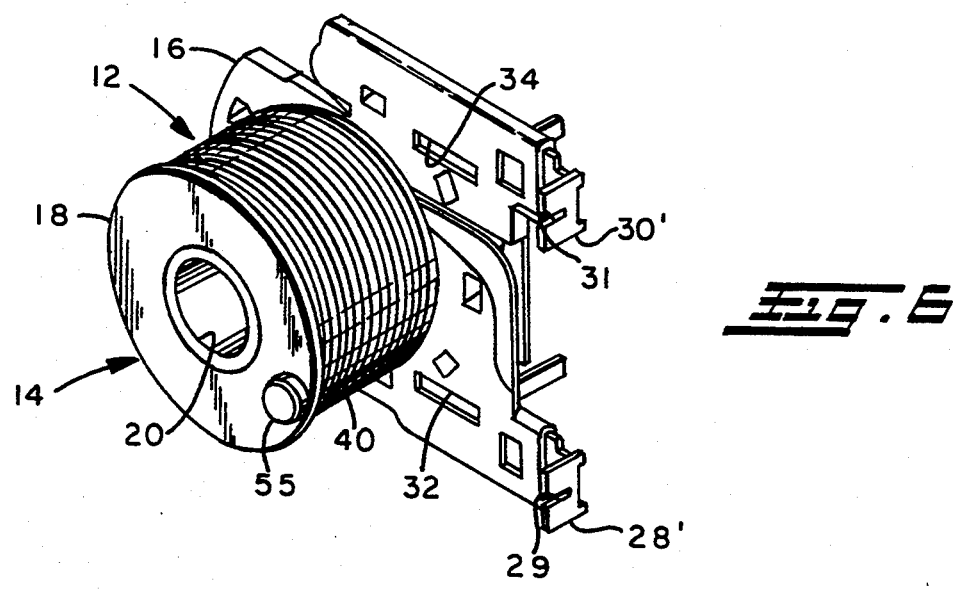
FIG. 6 is an axonometric view of the coil subassembly from the end opposite that shown in FIG. 3 and illustrating an alternate version of the connector terminals.

Referring to FIGS. 5 and 6, spool flange 18 has a lug or projection 55 formed thereon; and, stator cup 42 has a guide aperture 47 formed therein which engages projection 55 on the spool for orienting and accurately positioning the poles 44 of stator member 42 thereon.

A central ferromagnetic pole segment 48 has a generally cylindrical configuration and has a reduced diameter portion 50 provided on one end thereof which is received in the aperture 46 provided in the stator cup 42. The cylindrical pole segment 48 is secured in the aperture 46, preferably by pressing together axially with an interference fit or by weldment or metal deformation. The pole segment 48 has a reduced diameter pin or axle 52 extending from the opposite or free end thereof. The pole segment 48 has a second reduced diameter portion 54 provided on the end remote from aperture 46 which is secured, preferably by interference fit in aperture 62 of stator member 56. It will be understood that when the cup 42 is assembled onto the coil subassembly 12, axle pin 52 extends outwardly beyond the face of the enlarged end flange 16.

The stator means includes a second generally cup-shaped stator member 56 formed, in a manner similar to member 42, of material of relatively high magnetic permeability which has a second plurality of generally axially-extending finger-like pole segments 58 which are disposed to have the diameter of their array as in common with the array of the pole segments 44. The second stator member is disposed to be registered against the end face of spool flange 16 with pole segments 58 interdigitated between the pole segments 44. The second stator member 56 has the pole segments thereof preferably aligned by a suitable guide in the form of a projection or lug 60 extending from the face of spool flange 16, which is positioned with reference to lug 55 on the face of flange 18. The projection 60 engages the stator member 56 between the pole segments 58 and rotationally indexes and positions the pole segment precisely. The poles 58 of stator member 56 are thus located with respect to pole segments 44 of stator cup 42 by accurately locating lug 55 with respect to lug 60 during molding of the spool. The stator member 56 also has a central aperture 62 provided therethrough.

In the present practice of the invention, a version of the motor, shown in the drawings, having eighteen poles rotates at 400 rpm when operated on 60 HZ current, which is suitable for a timer motor. However, where direct drive of a fan or air blower is desired, a version of the motor having only six stator poles has been built and operates on 60 Hz current at 1200 rpm. It will be understood that if a higher motor shaft speed is desired, the frequency of the operating current may be raised: for example, 150 Hz current will yield a motor shaft speed of 3000 rpm. It will be understood that the motor of the present invention may be operated on sinusoidally alternating current or alternating pulsed current, or single polarity pulsed current where advantageous.

Referring to FIG. 3, a rotor subassembly indicated generally at 64 includes a hub 68 formed of thermoplastic material which has an integrally formed drive pinion 70 provided thereon and a central axial bore 72 which is sized to rotate freely on the axle pin 52. The hub 68 has radial extensions 74 which extend in opposite directions and which are adapted for engagement with an anti-reverse mechanism (not shown) to prevent the motor from starting in an undesired direction of rotation. The hub 68 has an enlarged diameter flange 76 which has press-fitted or molded thereon a permanent magnet ring 78 in a manner well known in the art. The permanent magnet ring 78 has a plurality of discreet pairs of poles disposed around the circumference thereof to interact with the pole segments 44,58. It will be understood that the magnetic poles on the rotor are equal in number and of alternating polarity to those of the stator, but the rotor poles are unequally spaced to assure starting torque.

In the presently preferred practice, the magnetic ring 78 is composed of ferrite powder molded in thermoplastic resin material. Rotor subassembly 64 may be retained on the axle 52 in any suitable manner as, for example, by a bushing or washer attached to axle 52; or, the motor may be mounted against a stationary structure by clamping about the periphery of the enlarged flange 16 and providing a boss or bushing to retain the rotor axially coincident with the pole segments 44,58. In the aforesaid fan drive version of the motor, pinion 70 would be omitted and the fan attached directly to hub 68.

In the presently preferred practice, the pinion 70 is formed as a separate member and engages the hub by suitable torque transmitting surfaces (not shown) such as a square or hexagonal interengagement. Preferably, the pinion is formed of thermoplastic such as polyester, admixed with elastomer to yield a material having a Shore "A" scale hardness in the range 55-65. The thermoplastic elastomer pinion has been found to reduce gear noise.

Referring to FIG. 6, an alternate version of the connector terminals is denoted by reference numerals 28',30' wherein the free ends of the terminals are bent at right angles and have tapered slots 29,31 formed therein for wedging external wires therein.

The present invention thus provides a unique subfractional horsepower permanent magnet synchronous a.c. motor which is easy to fabricate, low in manufacturing cost, and has a minimum volume for application in areas where space is at a premium, such as programmers utilizing a timing motor, cooling fans, or in air moving applications such as aspirators for sensors.

Although the invention has hereinabove been described with respect to the illustrated embodiment, it will be understood that the invention is capable of modification and variation, and is limited only by the scope of the following claims.

We claim:

1. A synchronous motor comprising:
   (a) a first stator member formed of material having a relatively high magnetic permeability and having a generally cup-shaped configuration with a plurality of discrete fingers formed integrally therewith and disposed in arcuately spaced parallel relationship;
   (b) a coil subassembly comprising a bobbin formed of nonconductive material having a pair of end flanges with one end flange of the bobbin having a greater radial extent than the other end flange thereof, including a pair of connector terminals extending outwardly therefrom, said one end flange having a plurality of arcuately spaced voids with one of said fingers of said first stator member received through each of said voids and extending axially beyond an end face of said one end flange; and, a coiled conductor wound about said bobbin forming a coil with opposite ends thereof connected each to one of said connector terminals;
   (c) a second stator member formed of material of relatively high magnetic permeability and having a generally cup-shaped configuration with a second plurality of arcuately spaced fingers extending therefrom in arcuately spaced parallel arrangement and interdigitated between said fingers of said first stator member, said second stator member registered against said bobbin;
   (d) a third stator member having an end portion thereof attached to the said first stator member and extending centrally through said bobbin with an opposite end attached to said second stator member, said third stator member including a stationary axle extending from an end attached to said second stator member; and,
   (e) a permanent magnet rotor nested within said interdigitated fingers and journalled for rotation on said stationary axle.

2. The motor defined in claim 1, wherein said rotor includes a drive pinion.

3. The motor defined in claim 1, wherein said rotor comprises a thermoplastic hub member defining a drive pinion integrally therewith having a ring of ferromagnetic material disposed thereabout.

4. A miniature synchronous motor comprising:
   (a) a coil spool formed integrally of insulative material having a pair of flanges extending radially outwardly therefrom formed on opposite ends of said spool with one of said pair of flanges having a substantially greater radial extent than an other of said pair, said one flange having a plurality of arcuately spaced voids formed therethrough;
   (b) a coil of conductive material wound on said spool;
   (c) stator means including a first plurality of ferromagnetic pole segments disposed in circumferentially spaced array about said coil, with said first plurality of pole segments each passing through one of said voids in said one flange with portions thereof extending therebeyond in a direction axially of said coil, and a second plurality of ferromagnetic pole segments interdigitated with said extending portions of said first plurality;
   (d) a ferromagnetic pole member interconnecting said first and second plurality of pole segments through said spool for forming a flux loop about said coil, said ferromagnetic pole member, including a stationary axle extending between said interdigitated pole segments; and,
   (e) a permanent magnet rotor disposed within said interdigitated pole segments and journalled for rotation on said axle.

5. The motor defined in claim 4, wherein said one flange includes a pair of connector terminals, each having one end of said coil attached thereto, said terminals adapted for external electrical connection thereto.

6. The motor defined in claim 4, wherein said rotor includes a hub of thermoplastic with a pinion of thermoplastic elastomer drivingly engaged therewith.

7. The motor defined in claim 4, wherein said stator means includes a first generally cup-shaped member defining said first plurality of pole segments and a second cup-shaped member disposed, respectively, on opposite sides of said spool.

8. The motor defined in claim 4, wherein said spool includes a first locating surface and a second locating surface formed thereon; and, said stator means includes a first registration surface contacting said first locating surface for precisely orienting said first plurality of ferromagnetic pole segments and a second registration surface contacting said second locating surface for precisely orienting said second plurality of ferromagnetic pole segments.

* * * * *